(12) United States Patent
Shoham

(10) Patent No.: US 6,285,989 B1
(45) Date of Patent: Sep. 4, 2001

(54) UNIVERSAL ON-LINE TRADING MARKET DESIGN AND DEPLOYMENT SYSTEM

(75) Inventor: Yoav Shoham, Palo Alto, CA (US)

(73) Assignee: Ariba, Inc., Mountain View, CA (US)

( * ) Notice: Subject to any disclaimer, the term of this patent is extended or adjusted under 35 U.S.C. 154(b) by 0 days.

(21) Appl. No.: 09/131,048

(22) Filed: Aug. 7, 1998

(51) Int. Cl.$^7$ .................................................. G06F 17/60
(52) U.S. Cl. ............................................. 705/37; 705/35
(58) Field of Search ..................... 705/37, 35; 707/505, 707/506, 507, 508; 345/962; 372/38; 395/701

(56) References Cited

U.S. PATENT DOCUMENTS

| | | |
|---|---|---|
| 3,581,072 | 5/1971 | Nymeyer ............................... 235/152 |
| 4,789,928 | 12/1988 | Fujisaki .................................. 364/401 |
| 5,101,353 | 3/1992 | Lupien et al. ......................... 364/408 |
| 5,136,501 | 8/1992 | Silverman et al. ................... 364/408 |
| 5,603,034 * | 2/1997 | Swanson ................................ 395/701 |
| 5,689,652 | 11/1997 | Lupien et al. ......................... 395/237 |
| 5,727,165 | 3/1998 | Ordish et al. . |
| 5,745,765 * | 4/1998 | Paseman ................................ 395/701 |
| 5,774,873 | 6/1998 | Berent et al. ........................... 705/26 |
| 5,794,207 | 8/1998 | Walker et al. .......................... 705/23 |
| 5,794,219 * | 8/1998 | Brown .................................... 705/37 |
| 5,799,284 | 8/1998 | Bourquin . |
| 5,812,572 * | 9/1998 | King et al. ............................. 372/38 |
| 5,812,668 | 9/1998 | Weber . |
| 5,835,896 * | 11/1998 | Fisher et al. ........................... 705/37 |
| 5,844,554 * | 12/1998 | Geller et al. .......................... 345/962 |
| 5,845,266 | 12/1998 | Lupien et al. .......................... 705/37 |
| 5,862,223 | 1/1999 | Walker et al. . |
| 5,890,137 | 3/1999 | Koreeda . |
| 5,890,138 | 3/1999 | Godin et al. ........................... 705/26 |
| 5,905,975 * | 5/1999 | Ausubel ................................. 705/37 |
| 5,913,210 | 6/1999 | Call . |
| 5,950,001 * | 9/1999 | Hamilton et al. ..................... 395/701 |
| 5,966,699 * | 10/1999 | Zandi ..................................... 705/38 |
| 6,014,643 | 1/2000 | Minton . |
| 6,055,518 | 4/2000 | Franklin et al. . |

FOREIGN PATENT DOCUMENTS

07296082 A   11/1995   (JP) .

OTHER PUBLICATIONS

Packaged apps give auctioneers rich new options, Frook, John Evan, Internetweek, May 25, 1998, Issue 716, p 14, 4/7p, 2 graphs.*

Moai intros auction software, Trommer, Diane, Electronic Buyer's News, Mar. 23, 1998, Issue 1101, p78, 1/4p.*

Auctions for business, Wilder, Clinton, Information Week, Mar. 16, 1998, Issue 673, p90, 2/3p, 1c.*

Legacy data links shrink costs, Millman, Howard, Info World, Jan. 5, 1998, vol. 20 Issue 1, p51, 2p, 1 chart, 1c.*

OpenSite Technologies Introduces Innovative Web Auction Partner Program, Business Wire Page: 08041472, Aug. 4, 1998.*

Scripting method based on temporal intervals for designing interactive systems, Mase, K.; Pinhanez, C.S.; Bobick, A.F., Transactions of the Information Processing Society of Japan, May 1, 1998, vol. 39 Issue 5 p 1403–13.*

(List continued on next page.)

*Primary Examiner*—V. Millin
*Assistant Examiner*—Pedro R. Kanof
(74) *Attorney, Agent, or Firm*—Blakely, Sokoloff, Taylor & Zafman LLP

(57) ABSTRACT

A method and an apparatus for a universal auction specification system is disclosed. The universal auction specification system comprises a network accessible set of trading primitives. A script generator is used for combining the set of trading primitives into a temporal protocol script representing a particular auction specification.

13 Claims, 7 Drawing Sheets

OTHER PUBLICATIONS

Emaze Software offers WebThread, ScriptWizard on Buy-Direct.com, Business Wire Page: 12120089, Dec. 12, 1996.*

Going . . . Going . . . Gone!(FairMarket's Web Auction site, and Emaze Software's Emaze Auction Web auction software), Cohen, Emily, PC Magazine, vol. v17 Issue n15, Sep. 1, 1998, May 1998.*

ONSALE, About ONSALE, 1996, 2 pages.

ONSALE, Auction Formats, 1996, 2 pages.

ONSALE, Auction Supersite, Sep. 8, 1997, 7 pages.

ONSALE, ONSALE Home, Sep. 8, 1997, 4 pages.

Current Catalog, Christmas Wishes, 1991, 4 pages.

Search Report for PCT/US/00/015982, mailed Aug. 23, 2000, 2 pages.

Search Report for PCT/US00/17449, mailed Nov. 14, 2000, 1 page.

* cited by examiner-

UNIVERSAL ON-LINE TRADING MARKET DESIGN AND DEPLOYMENT SYSTEM

FIELD OF THE INVENTION

The present invention relates to the use of networked computer systems for the design and deployment of an on-line trading market.

BACKGROUND OF THE INVENTION

The Backdrop of Electronic Commerce

Technological advances in electronic commerce (e-commerce) solutions have revolutionized the way business is conducted. The popular explosion of the Internet, the ubiquity of the browser, the network infrastructure and the e-commerce solutions that glue these technologies together, have led to several developments:

- new channels for buying and selling have emerged over the Internet,
- buyers and sellers are more accessible to each other then ever before,
- commodities as well as non-commodities can now be bought and sold at variable prices, determined by the buyer's willingness to pay and the seller's willingness to accept.

These dynamics are driving towards the creation of new and more efficient online markets that employ auction methodologies. The design, implementation and maintenance of auction solutions for these markets require sophisticated software technology.

Background on Auction Theory and Practice

The following is a brief introduction to various conventional auction settings and methods, starting with "low-end" auctions and concluding with "high-end" ones.

(1) Setting: Single seller, multiple buyers. Methods: The four well-known basic types are English auction, Dutch auction, first price sealed-bid auction, and second-price sealed-bid auction. These auctions and related ones have been well studied and continue to be so.

(2) Setting: Single seller, multiple units of goods. Methods: Auctions for such situations are only slightly more complex, but essentially are a natural generalization of the first kinds of auction.

(3) Setting: Multiple buyers and sellers. Methods: Variety of double auctions. In some cases the previous methods extend well, in others not at all (see below).

(4) Setting: Multiple buyers and sellers interacting repeatedly. Methods: Continuous Double Auctions, prime examples of which are the financial and commodity exchanges.

(5) Setting: Multiple goods with complementarities and substitutabilities. Methods: Vary. In any of the above settings, if multiple goods are sold whose values interact (i.e., if the value of a bundle of goods is not equal to the sum of the values of the individual goods), the auction design can be challenging. Known theoretical solutions, such as the Generalized Vuckrey Auction or the Clark-Grove tax mechanism, are not applicable in practice. Some pragmatic alternatives that have been experimented with include menu bidding and the simultaneous ascending bid auction with activity rules.

(6) Setting: Extra-economical constraints. Method: Activity rules. Often the auction is conducted within a business context that prescribes or precludes certain actions. A typical example is presented by regulatory constraints, that preclude selling certain goods to buyers with excessive market power.

The above is only a synopsis of the space of auction types. It is possible to enumerate many dozens of other auctions and variants thereof. In addition to these codified auctions, but which we mean types of auction that are well established, deployed, and studied, there exist essentially an infinite space of possible auctions, each defined by particular idiosyncratic rules and parameters.

A good example of idiosyncrasy of high-end auctions is the design of the California Power Exchange (the CalPX, or simply PX). The PX is a double auction in which buyers and sellers of electrical power trade on a daily basis. The PX is designed to support at least two kinds of market—the day ahead market and the hour ahead market. In the day-ahead market twenty-four different auctions take place in parallel, one each for an hour of the next day. The rules for participation in each auction are complex, but here is a flavor. The bidding proceeds in rounds. In any given round a seller may offer to sell a certain quantity at a certain price, and a buyer may submit a similar buy bids. The price in the round is selected so that supply equals demand (the "clearing price"). In the next round, a seller may only decrease his bid, and a buyer may only increase it (in both cases there is a minimum change required). In addition to these rather simple rules, there is an additional rule, which is designed to encourage bidders to bid meaningfully rather than wait to the last round before doing so. According to this "activity rule", a seller whose price exceeded the clearing price in the previous round must improve his/her bid, or forever lose the right to do so (a similar rule applies to buyers). Finally, in addition to this activity rule, bidders may (irrevocably) withdraw bids.

The reasons for this particular design are too complex to go into, and irrelevant to the current invention. The point of this example is that in that particular context there was a need to design a novel auction mechanism, different from any that existed previously. Similar phenomena have occurred in national spectrum auction designs (for example in the US, New Zealand, Australia, Mexico, and other locations), other energy auctions, offshore oil drilling rights, and many other settings.

Despite the in-principle infinite span of possible auctions, the set of primitives underlying the various auctions is relatively small. It is this observation that underlies the present inventions, and which allows the construction a universal engine for the rapid creation and deployment of an essentially unlimited number of auction types.

Background on Internet-based Auctions

While thousands of auctions take place today on the Internet, they are consumer oriented, and by necessity of the low-end variety. Such auctions are conducted by online auction services, such as Onsale.com, eBay.com, and Priceline.com. In addition the technology developed by such firms in-house, several toolkits exist in the prior art with which to construct and run simple auctions. Examples include Opensite and Bonsai Software, as briefly described below. The auctions supported by these systems are low-end ones, though a certain degree of customization is allowed (for example, specifying the duration of the auction or selecting among several simple auction formats). Following is a brief discussion of some of these technologies.

The products of OpenSite, Inc. and Bonsai, Inc. represent well the state of the art in Internet-based auction toolkits and solutions. OpenSite offers solutions for hosting online, interactive Internet auctions. OpenSite sells three types of auction software solutions, which correspond to small, medium and large businesses. Opensite offers four different types of auctions. The additional configuration of the product to the customer's environment is extremely limited, and thus the software cannot be applied universally to a wide range of different types of customers. Similarly, Bonsai builds custom online auctions for particular applications. Its core product, EasyAuction, is very basic auction system. To implement specific auction types, Bonsai must resort to standard, labor-intensive custom software development.

The product of Moai, Inc. typifies products that are not auction products in themselves but rather specific software solutions, which embody auction technology. Moai builds software for creating online auctioning solutions for manufacturers or resellers, to sell surplus-goods and excess inventories. While Moai's software solution can be tailored to meet the needs of the customer, the auction style and mechanism do not change from one environment to the other. In that respect, the type of customers that Moai can cater to are limited by the applicability of the specific auction type that Moai uses.

Onsale, Inc. and Priceline, Inc. are the best representatives of Internet-based auction houses procure goods. Both have developed in-house software with which to conduct auctions. These home-brew systems were designed to the specific needs of the companies, and do not have the universal functionality to be modified readily, to be deployed in a completely different business context that may require auction solutions. The software is not available for easy deployment as a package, without massive customization, to other environments that require auctioning solutions.

The Industrywide Mortgage Exchange (IMX), FastParts, and the National Transportation Exchange (NTE) are good representatives of industry-wide online auctions. In each case one or more standardized goods (mortgages, DRAM chips, trucking capacity) are bought and sold on an open exchange, much like the securities on the financial exchanges. Again, these systems are without exception built specifically for a particular type of market and cannot be easily or economically re-configured for other types of markets.

When one moves from the low-end of auctions to the high end, the custom-building approach is particularly apparent. Auction systems have been built in a one-off fashion, costing many millions of dollars and taking a very long time to build. These auctions are always suited only for the particular applications for which they were designed. Examples include the software developed for financial exchanges such as the London Stock Exchange and NASDAQ, the California Power Exchange, and the software developed for Federal Communications Commission (FCC) spectrum auction. Each of these systems was developed over many months and typically over years, and has cost from several million dollars to several hundred million dollars. These systems are also quite inflexible, constituting systems suitable for a particular application and not adaptable for the general case. A good example is provides by the CalPX). Its development cost upward of $50M, and it has proved frustrating to introduce even minor modifications to the system; these have tended to entail major surgeries on the system as a whole. Indeed, the very initial design was not implemented initially, since the software could not accommodate iterations.

In summary, to date any would-be online market creator has had two options—develop the software from scratch (either in-house or by outsourcing), or use one of several extremely limited toolkits. In all cases, the resulting software has taken a long time to develop, and the end results proved to be very difficult to modify or augment. The latter property has been particularly limiting, since it is a consistent experience with exchanges that the initial rules must be modified, either because the market designers had not design the best rules in the first place, or because the market requirements had changed.

Closest to filling this gap has been AuctionBot, a software system built by Dr. Michael Wellman and his colleagues at the University of Michigan. AuctionBot is a service that allows a party to start one of several kinds of auction, and then proceeds to run and manage the auction—accepting bids, notifying bidders of auction results, et cetera. It is to our knowledge the most versatile such service. The auctions it supports include $M^{th}$ and $M+1^{st}$ price auction (which are generalizations of $^{st}$- and $2^{nd}$-price auction, respectively, to the case in which multiple units of good are being sold, possibly by multiple sellers), English auction. However, AuctionBot too suffers an inherent shortcoming—while it supports a broader set of auctions than other services, there is nothing universal or extensible about that set. In particular, if one wishes to add a new auction type to AuctionBot, for all intents and purposes one must write a brand-new program. In particular, AuctionBot cannot support activity rules of the sort encountered in industrial markets such as the FCC spectrum auction and the CalPX.

What has been missing is a highly versatile toolkit with which to quickly define and deploy a wide range of online markets, in particular markets in the medium to high end, and be able to modify the rules of these market on the fly without needing to engage in a lengthy software development process and service disruption.

SUMMARY OF THE INVENTION

The present invention is a method and apparatus for designing and deploying an interactive, real-time, universal on-line trading market system serving traders communicating via the Internet.

The present invention is a method and apparatus that can be used to build any type of online auction using building blocks of its software technology. It includes a generic toolkit that can be used to build auction solutions ranging from simple to very complex and sophisticated auctions.

The invention includes a universal auction specification system including a network accessible set of trading primitives and a script generator for combining the set of primitives into a temporal protocol script representing a particular auction specification. The system also includes a script interpreter for interpreting a temporal protocol script representing a particular auction specification, the script including references to at least a portion of the set of trading primitives.

DETAILED DESCRIPTION OF THE PREFERRED EMBODIMENT

The present invention is a method and apparatus for designing and deploying a universal, interactive, real-time, on-line trading market system serving traders communicating via the Internet and similar networks. In the following detailed description, numerous specific details are set forth in order to provide a thorough understanding of the present invention. It will be evident, however, to one of ordinary skill in the art that the present invention may be practiced without these specific details. In other instances, well-known structures and devices are shown in block diagram form in order to avoid unnecessarily obscuring the present invention.

Figure 1:
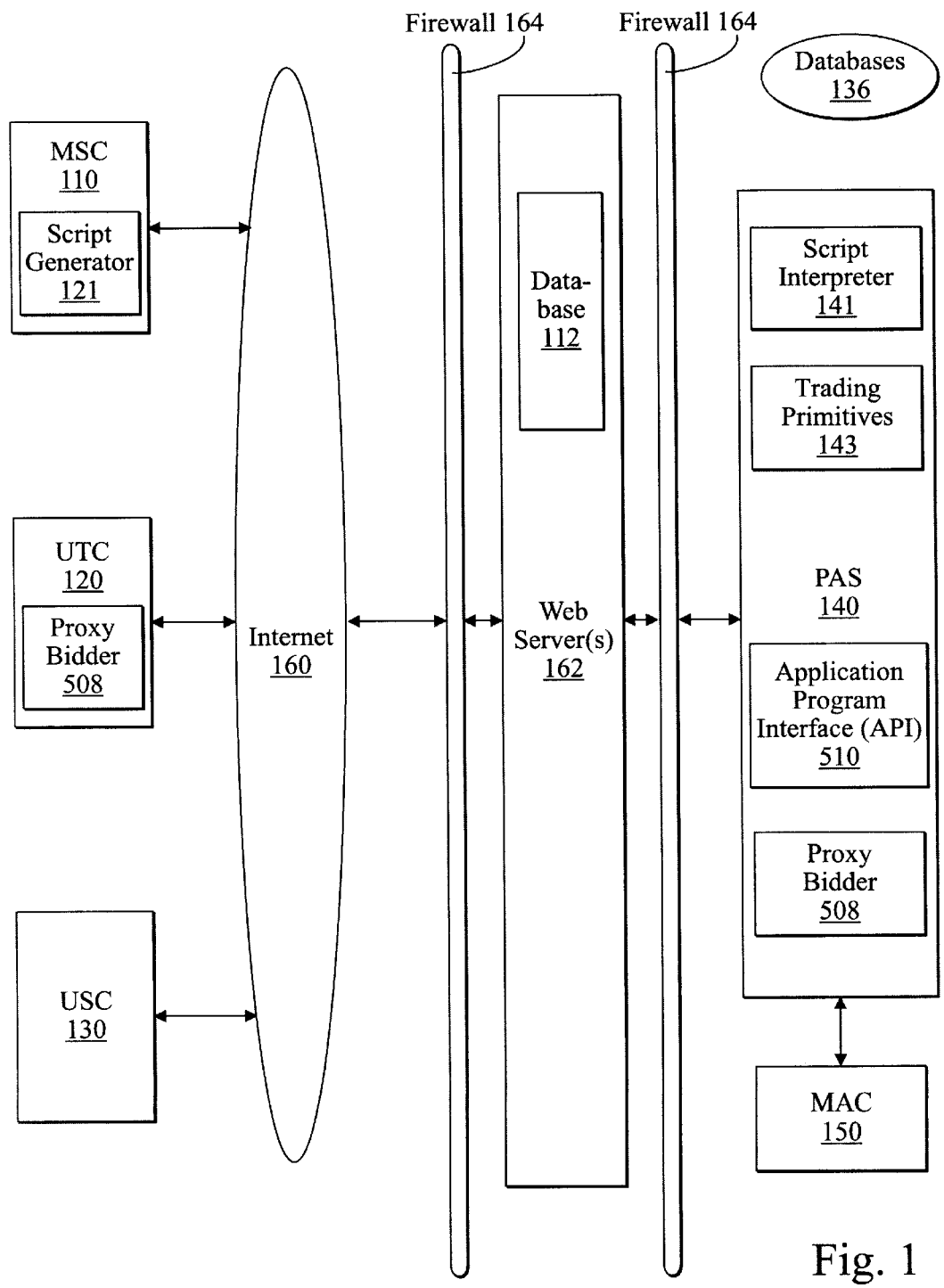
FIG. 1 is a system block diagram showing the components of the preferred embodiment.

Referring to FIG. 1, the present invention includes the following primary components:

1. A Market-Specification Console (MSC) 110. This component consists of a computer running a program with which a market designer may specify any of an infinite number of possible market protocols, and then submit ("upload") the defined market to the Programmable Auction Server (PAS) 140 for execution. These markets can be as simple as English or Dutch auction with some parameters filled in, or an arbitrary novel design never encountered before.

2. A Programmable Auction Server (PAS) 140. This component consists of a computer running a program, which can accept multiple market, protocols submitted to it from market-specification consoles, and executes those protocols as prescribed. Such execution includes, but is not limited to, opening auctions, accepting bids, clearing prices, notifying traders of market events, and closing auctions.

3. A Universal Trading Console (UTC) 120. This component consists of a computer running a program, which enables a trader to trade in any market protocol executing on the PAS 140. The UTC 120 presents to the trader information in a way that automatically adapts to the specific market protocol executing, and allows the trader to participate in the trading.

4. A Universal Surveillance Console (USC) 130. This component consists of a computer running a program which enables a surveillance body—such as a regulatory agency or and independent audit firm—to monitor the operation of the markets executing on the PAS 140, ascertain that the execution conforms to norms, and optionally intervene in the market when deviations are detected.

5. A Market Administration Console (MAC) 150. This component consists of a computer running a program which enables a market operator, an entity housing the PAS 140 and responsible for its operation, to monitor the execution of various markets operating on the PAS 140 and troubleshoot the system in real time.

6. A communication network 160 linking the various components.

In the preferred embodiment, the various components are organized into a complete system via a 3-tier architecture bounded by double firewalls as depicted in FIG. 1. The 3-tier architecture is described in more detail in a later section of this document. We now describe the various components in more detail.

The Market-Specification Console (MSC)

The role of the Market-Specification Console (MSC) 110 is to make to the market designer available the full spectrum of market protocols, and available in an intuitive fashion. These market protocols range from simple auctions such as English, Dutch, $1^{st}$ and $2^{nd}$ price auctions, to highly complex auctions such as those conducted on the trading floors of financial exchanges and the CalPX. The repertoire of auctions includes, but is not limited to, the ones provided and classified in Table 1 below.

Table 1

1. Multiple items, single seller:
    A. Divisible shares of a homogenous commodity:
        These are classified in terms of the pricing rule (uniform price [lowest accepted or highest rejected], or pay-your-bid, or Vickrey rule), static or dynamic (sealed bid versus ascending prices), and the dynamic ones are further classified as follows:
        Auctioneer asks whether there are new bids
        Iterations with a required minimum bid increment
        Price rises continuously until demand=supply
        Vickrey: price differentially to make revelation a dominant strategy
    B. Heterogeneous items: Same options as above, plus Simultaneous, iterative, ascending price (e.g., FCC spectrum auction) Generalized Vickrey auction
2. Multiple homogeneous items, multiple buyers and sellers:
    A. Exchanges (no intermediary market makers):
        Call market [static, uniform pricing]
        Tatonnement [dynamic, uniform pricing] (e.g., power exchange)
        Bid-ask bilateral market [dynamic, differing prices]
        Double Dutch [dynamic, uniform price]
        UPDA [dynamic, bilateral, uniform price, different activity rules]
    B. Brokered markets:
        Specialist market [bilaterally cross orders from a book]
        Dealer market [continually post best bid and ask prices]

There are two ways in which a market designer defines a market. The first is by selecting among one of the market protocols already residing on the PAS 140, and specifying the values of the relevant parameters in that protocol. For example, specifying the minimum increment and start time in an English auction. However, this method alone is inherently flawed, since the space of possible market designs is infinite, and any fixed repertoire of built-in auctions, rich as it may be, is guaranteed to fall short. The crux of the present invention is the ability to define novel market protocols suited to any given situation.

An extreme approach to achieving versatility is to allow the market designer to write an arbitrary computer program. As discussed, this cumbersome method is prone to all the pitfalls of software developments, including requirement of highly skilled software personnel, long development time, long testing and validation time, and high cost. The key to achieving such versatility while avoiding these pitfalls is to recognize that, while the number of possible market protocols in infinite, the set of principles involved is circumscribed. In particular, any given market protocol can be broken down into three ingredients:

1. The set of entities allowed to participate in the market;
2. A set of basic Trading Primitives (TPs) involved in the market; and
3. A time line, specifying the times and conditions under which each entity either may or must execute a TP.

The market entities include sellers, buyers, an auctioneer, dealers, specialists, settlement agencies, accreditation bodies, and other entities.

The set of primitives is more involved. There is in fact no unique set of primitives, but rather several such sets can be created. Together with the gluing mechanism discussed below, the richness of the set of TPs defines the space of market protocols. A representative set of TPs is provided in Table 2. It is to be understood that each such primitive is implementable as a method in an object oriented setting, and as such possesses additional structure not depicted in the table (including, for example, the number of arguments and their types).

TABLE 2

| Entity with Permission | Primitive | Description |
| --- | --- | --- |
| Market Operator | Define trade items | Specify goods to be traded |
| Market Operator | Define bid format | Self-explanatory |
| Market Operator | Define disclosed information format | Self-explanatory |
| Market Operator | Define pricing rule | Self-explanatory |
| Market Operator | Define allocation rule | Self-explanatory |
| Market Operator | Disclose information requested by an individual | Self-explanatory |
| Market Operator | Broadcast unsolicited information | Self-explanatory |
| Market Operator | Start negotiation phase | Self-explanatory |
| Market Operator | Conclude negotiation phase | Self-explanatory |
| Market Operator | Close market protocol | Self-explanatory |
| Market Operator | Announce market protocol results | Self-explanatory |
| Trader | Register item for sale | Self-explanatory |
| Trader | Post security in escrow account | Self-explanatory |
| Trader | Submit bid | Self-explanatory |
| Trader | Withdraw bid | Self-explanatory |
| Trader | Make bilateral offer | Self-explanatory |
| Trader | Request information | Self-explanatory |
| Market Operator | Define Simple Bid restrictions | Examples: Minimum bid intervals (bids must be in even $1 quantities for example) Permitted currencies for bids (dollars, yen, . . .) |
| Market Operator | Define Market Based Restrictions | Examples: No one is permitted to bid on good A and good B. More generally no one is permitted to bid on specified combinations of goods. |
| Market Operator | Define Trader Specific Restrictions | Examples: Trader A is not permitted to bid on good P. Trader B is not permitted to bid more than a total of X dollars. |
| Market Operator | Define Trader Eligibility Restrictions | A specialization of Trader Restrictions that is common enough to warrant its own category. Example: Trader A may not bid fewer $ than in a previous stage of the auction. |
| Market Operator | Define Trader Activity Restrictions | Another specialization of Trader Restrictions that is common enough to warrant its own category. Example: Trader A must submit a winning bid every Z hours to continue participating in the auction. |
| Market Operator | Define Dynamic Restrictions of the above types. | Dynamic in the sense that the restriction becomes active based on some event in the market. Example: If trader A modifies a bid by more than Z % then close access to the market for trader A and investigate for gaming behavior. |
| Market Operator | Define Information Access Rights | These rights define what information is available to which participants. For example, buyers, sellers, observers, and auditors may have very different permissions. |
| Market Operator | Define Logging Structure | The system is very modular and allows flexible logging. For example a market operator may specify that bids should be logged after specific stages (after entry into system, after passing restriction checks, after auction processing, . . .) The detail of the log information will also be controllable. |
| Market Operator | Define Bid Priority Rules | Bid A is Better than Bid B if: 1) the price in A is greater than the price in B, 2) Or, if equal prices then if time of bid A is earlier than time for B, . . . |
| Trader | Register | May be extensive and involve financial deposits, or could be quick involving identification only. |
| Trader | Receive Confirmations | Auction may send confirmations of bids, information requests, trades, . . . |
| Settlement Agency | Receive Trade Details | Describes what goods and funds must be transferred between traders. |

Finally, there is a gradation of methods with which to specify a time line, ranging from simple and limited in expressiveness to complex and highly expressive.

A simple way to specify a time line is to list the steps exhaustively, and tag each step for the time at which, and conditions under which, the step is taken. The time can refer to absolute time or to time relative to other events in the execution stream ("after five minutes of inactivity close the auction"). Conditions can refer to any information that is part of the execution, and in particular the termination conditions of other steps ("if the last bid was for $x, then set the minimum next bid at $x+10").

For a number of reasons, exhaustively enumerating all the steps is limiting. At a minimum, for the system to have any generality, one must allow for iteration ("repeat until there is no bid increment for five minutes: <. . . >"). These may be introduced as a special aggregate TP, or as part of a "scripting" tool for the market. Indeed, the most general method of specifying a time line is to invoke the full power of a scripting language, such as TCL/TK, JavaScript, or any number of other scripting languages, so long as they (a) have access to a time-of-day clock, and (b) can call the TPs. In the preferred embodiment of the invention utilizes such a conventional scripting language applied to a novel use with TPs, which we shall call generically CommerceScript, understanding the term as a placeholder rather than a proper name. In FIG. 1, script generator 121 is used to generate a CommerceScript in the preferred embodiment in the manner described above.

The temporal nature of CommerceScript enables an additional level of convenience in market specification. Rather than restrict the market designer to textual scripting, the system of the present invention can present to the designer a visual scripting option. In this option, the designer can graphically draw a time line, and place along the time line various trading primitives. Each TP is annotated with relevant information, including the market entity executing the TP, whether this execution is mandatory or merely permissible, and what preconditions must precede this step in addition to the temporal precondition. The output of the visual specification component is identical to that of a textual specification component. It is noted that various visual programming tools exist in the prior art, however, such tools have not been applied to the creation of a trading market specification. One key novel element in the visual specification component of the present invention is the annotation of processing steps as "mandatory" or "permissible", which is unique to the commerce application.

The Programmable Auction Server (PAS)

The extreme versatility of the MSC 110 calls for commensurate versatility on the part of the Programmable Auction Server (PAS) 140. Indeed, at the core of the PAS 140 is an interpreter for CommerceScript, a built-in implementation of the TPs, and a built-in set of market protocols. The script interpreter 141 is illustrated in FIG. 1. Importantly, the PAS 140 is extensible. Both the built-in set of TPs and the built-in set of market protocols can be enriched by a market designer submitted a new ones. Each augmented market protocol is called a Trading Cartridge; there is in principle no bound on the range of allowable Trading Cartridges, other than the pragmatic limitations of the PAS 140 in terms of computer memory and other computational resources. In the preferred embodiment, the set of TPs is augmentable in a more cautious way for security and robustness reasons. We discussed this topic next.

In a trading system, it is extremely important to manage the permissions granted to the various market entities. Such permissions start with simple matters such as registering as a trader to registering an item for sale, continue with securing rights to trade on the system and within certain limits, and (very importantly) include specification of access rights to trading information. A critical feature of the PAS 140 is its generic way of handling permissions regardless of the particular market protocol executing. Each step in the execution of the protocol is gated by the type of the trading primitive being executed, its particular instantiation (in particular, the value of the arguments), and the entity attempting to execute it.

In industrial applications it is as important to ensure robust system behavior—including fault tolerance, defense again malicious infiltrators, as well as against incompetent market entities. For this reason, in the preferred embodiment, many components are added to ensure robust behavior. This robust behavior is supported in the preferred embodiment by the 3-tier system architecture described in detail in a later section of this document.

An important feature of the PAS 140 in the preferred embodiment is that it logs every activity that takes place on the system. This creates a perfect audit trail, which is usually expected by the market participants, and sometimes required by regulation. Of particular importance is the trade registration module. This module is responsible for recording all consummated trades and the obligations incurred as a result. This stands in contrast to usual practice on financial exchanges, where the registration and settlement services are provided from outside the trading system, usually by investment banks. Here too, it is possible for third parties to provide the registration service, but from the technical point of view this module is an integral part of the system.

Finally, in the preferred embodiment the PAS 140 possesses a rich set of Application Program Interfaces (APIs) 510. The purpose of the APIs is to turn the system from a closed one, which one can use in totality or not at all, into an open system that one may add components or services to and have these additions integrate seamlessly with the existing components. For example, the APIs allow integration of PAS 140 with legacy software, with accreditation agencies, and most importantly, with programs performing trades which bypass the Universal Trading Console 120 discussed below.

The Universal Trading Console (UTC)

The UTC 120 offers the trader two functionalities—display of information, and bid input. The information displayed to the user is of kinds: 1) activities on the PAS 140, and 2) ancillary information. PAS 140 activities are in principle any event logged by the PAS 140, such as the start of an auction, the bids placed, and the prices cleared. Actual information displayed will vary dramatically from one market to another, reflecting the different market designs. In particular, the amount of information displayed may vary. For example, two Simultaneous Ascending Bids auctions may vary on the information disclosure policy, with the one auction releasing after each round the entire list of bidders and their bid in that round, whereas another might release only the aggregate bids supplied with no bidder-specific information. Ancillary information may be any information that is relevant to making trade decisions but that is not inherent in the market activity. For example, in energy markets as well as many other futures markets weather forecasts turn out to be quite important.

The bids entered by the trader are entered in one of two ways—direct bidding, or proxy bidding. In direct bidding the bidder manually selects an auction and enters a bid using the computer keyboard and mouse. In proxy bidding, the user defines a script that bids on his or her behalf in one or more auctions running on the PAS 140. As part of the proxy bid, the trader also specifies whether the script is to run on the trader's machine (i.e. proxy bidder 509), or be transmitted to the PAS 140 and run there (i.e. proxy bidder 508).

The challenge in delivering these two functionalities—information dissemination and bidding collection—is the wide variance in the format of both the information and the bids among different types of auctions. In the preferred embodiment, this diversity is accommodated by introducing a database layer between the PAS 140 and the UTC 120. For each auction type, several specific database schemas must be introduced. The PAS 140 populates the database with specific data and that data is displayed in the UTC 120 automatically using dynamic HTML. The key feature of this design is that while the database tables in the PAS 140 must be created specifically for the particular auction, the UTC 120 requires no modification.

The Universal Surveillance Console (USC)

Every professional trading market is associate with one or more surveillance bodies, whose job it is to monitor the trading activities and ensure that they adhere to certain standards. Such monitoring is essential to ensure that traders have continued faith in the operation of the market, and that applicable laws and regulations are observed. Such monitoring bodies can be federal agencies such as the SEC in financial markets, the FCC in telecommunication, or FERC in energy; State agencies such as the California Public Utility Commission (CPUC); internal monitoring departments of exchanges, and external private audit agencies. The USC 130 is much like the UTC 120, in that it presents to the surveillance agency information from the marketplace. The primary difference is that the USC 130 does not provide for ways in which to trade in the market, but on the other hand does provide market controls that are not provided to traders. Examples of such controls are broadcasting messages that appear on all UTCs 120, and halting trading activity.

Three-Tier Architecture of the Preferred Embodiment

Figure 2:
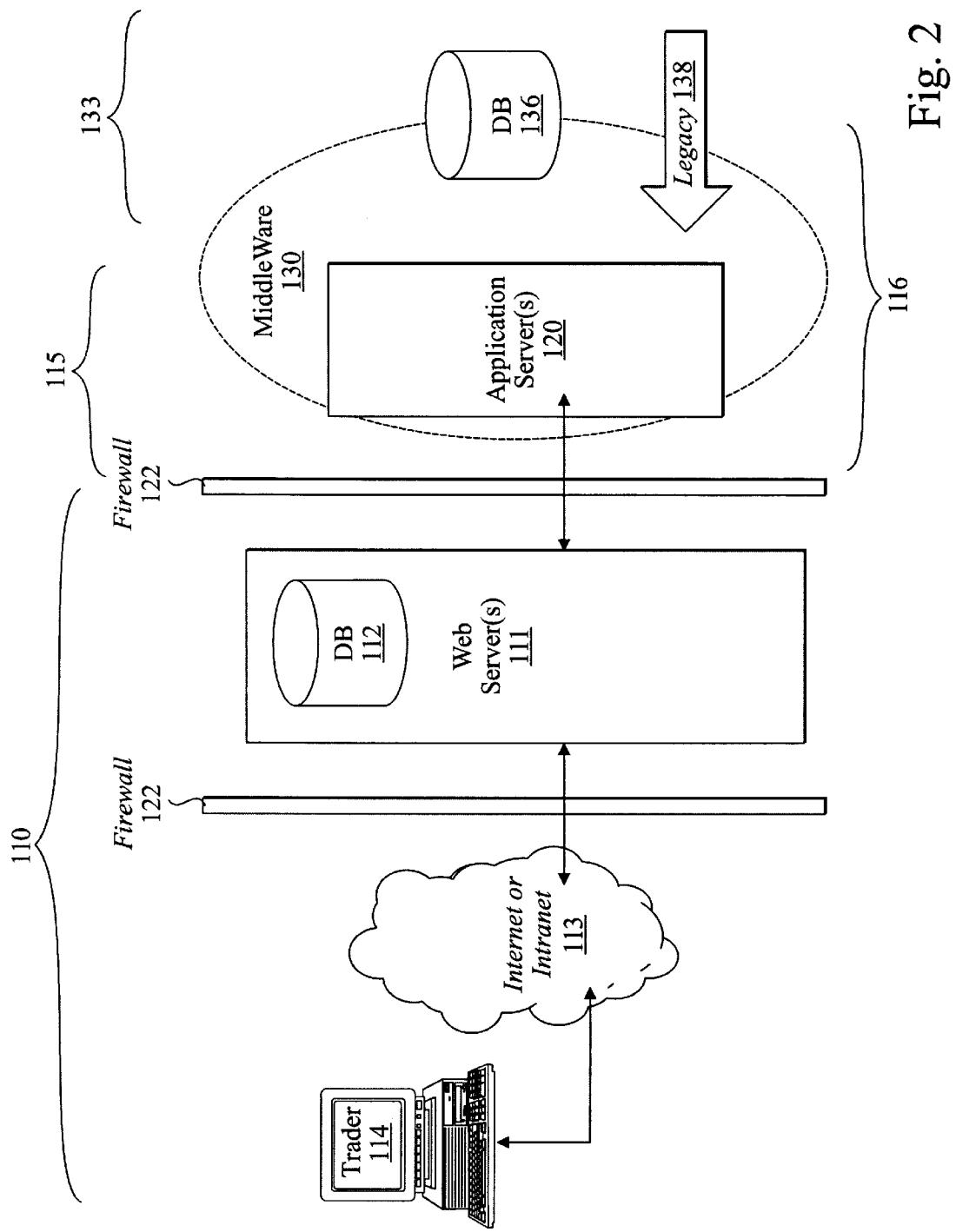
FIG. 2 illustrates a three-tier specific embodiment of the present invention.

The system of the present invention is designed to adapt to the needs of a variety of different types of trading markets. Operating on a wide range of hardware, from single-user personal computers (PCs) to integrated, client/server based platforms; the system of the present invention is well suited to a small number of users and to a market with thousands of users. The system may be field-modified to handle an increasing number of users as market requirements mature and change. FIG. 2 shows a particular three-tiered architecture that supports this scalability in the preferred embodiment. Note that other equivalent system architectures may be implemented.

Referring to FIG. 2, the first tier 110 includes a front-end database 112 and Web applications running on Web server(s) 111 that constitute the interface between the users 114 and the back-end 116 of the system. Authorized users may access the system through a web browser. The Graphical User Interface (GUI) may be run either as a Java Applet or as a common HTML (depending on the user's choice and browser version). The Java and HTML programming languages are well known to those of ordinary skill in the art. To secure the system, the Web application is surrounded by a firewall 122 in a DMZ (Demilitarized Zone) configuration making it almost impossible to penetrate the application server(s) 120. The application's logic constitutes the second tier 115. The middleware 130 environment is component-based allowing high-availability and scalability. The third tier 133 contains the database 136 and the interface 138 to a market administrator's legacy systems. Note that because the output of the auctioning process is being polled by a legacy system, the full security of the legacy environment is assured at all times. This will be described in more detail below.

Figure 3:
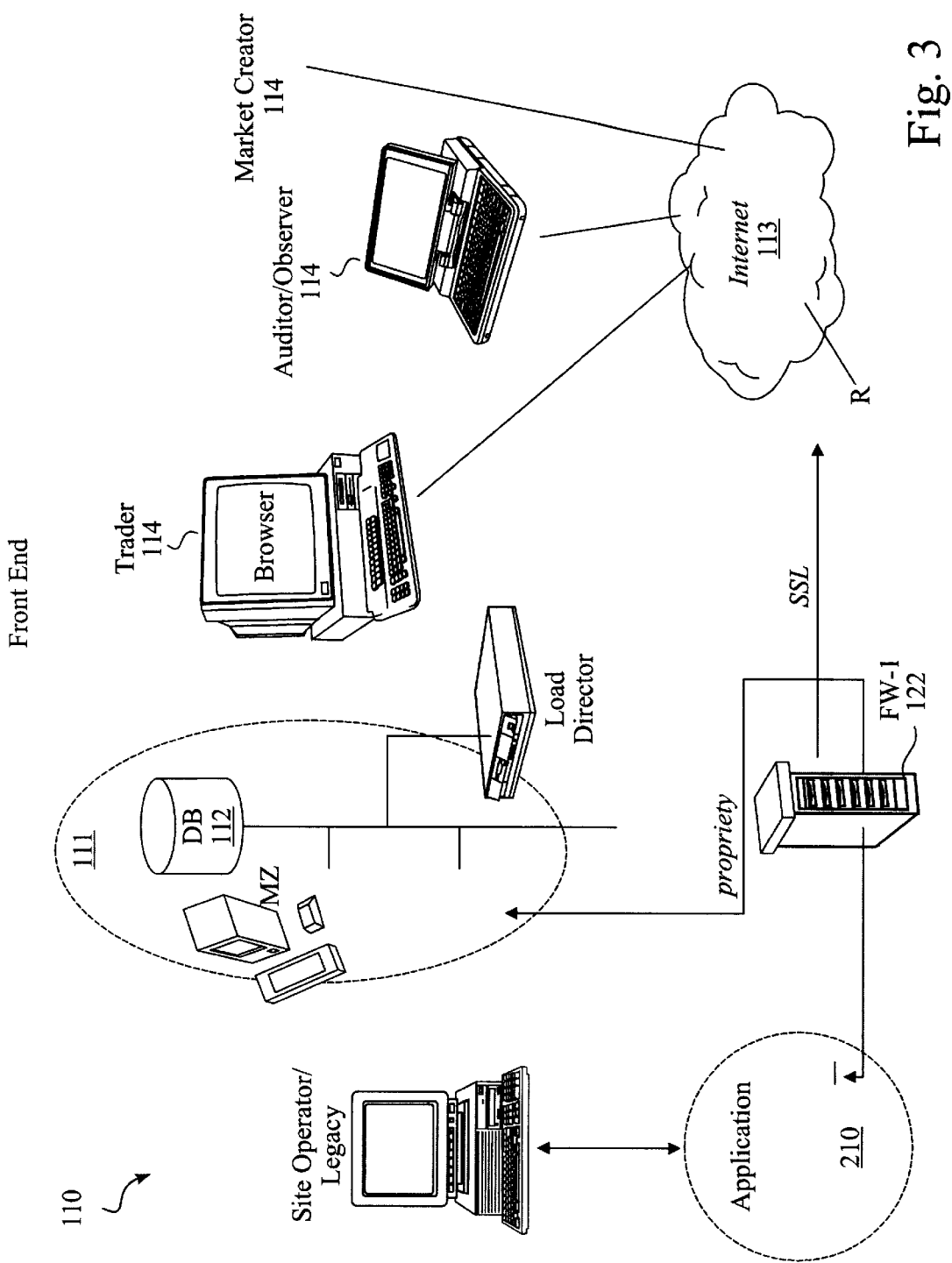
FIG. 3 illustrates the front end architecture of the preferred embodiment.

FIG. 3 illustrates a more detailed description of the front-end 110; all users 114 may log on to the system over the Internet 113. Once connected, the browser running in user computer 114 shifts to a conventional Secure Sockets Layer (SSL) mode to secure the session data. After the user is authorized, a connection is established with a cluster of Web servers 111 through a firewall 122. Each Web server 111 uses a front-end database 112 to communicate with the application 210 running in the second tier 115. Queries and bids stored in the front-end database 112 are being polled by the application 210 in the second tier 115 to further secure the application 210. Communication to the application 210 running in the second tier 115 is monitored by another leg of the firewall 122 as yet another measure of security adds an additional layer of security. Each web server 111 is coupled with an application server 120 as to maintain sessions over a connectionless protocol.

Figure 4:
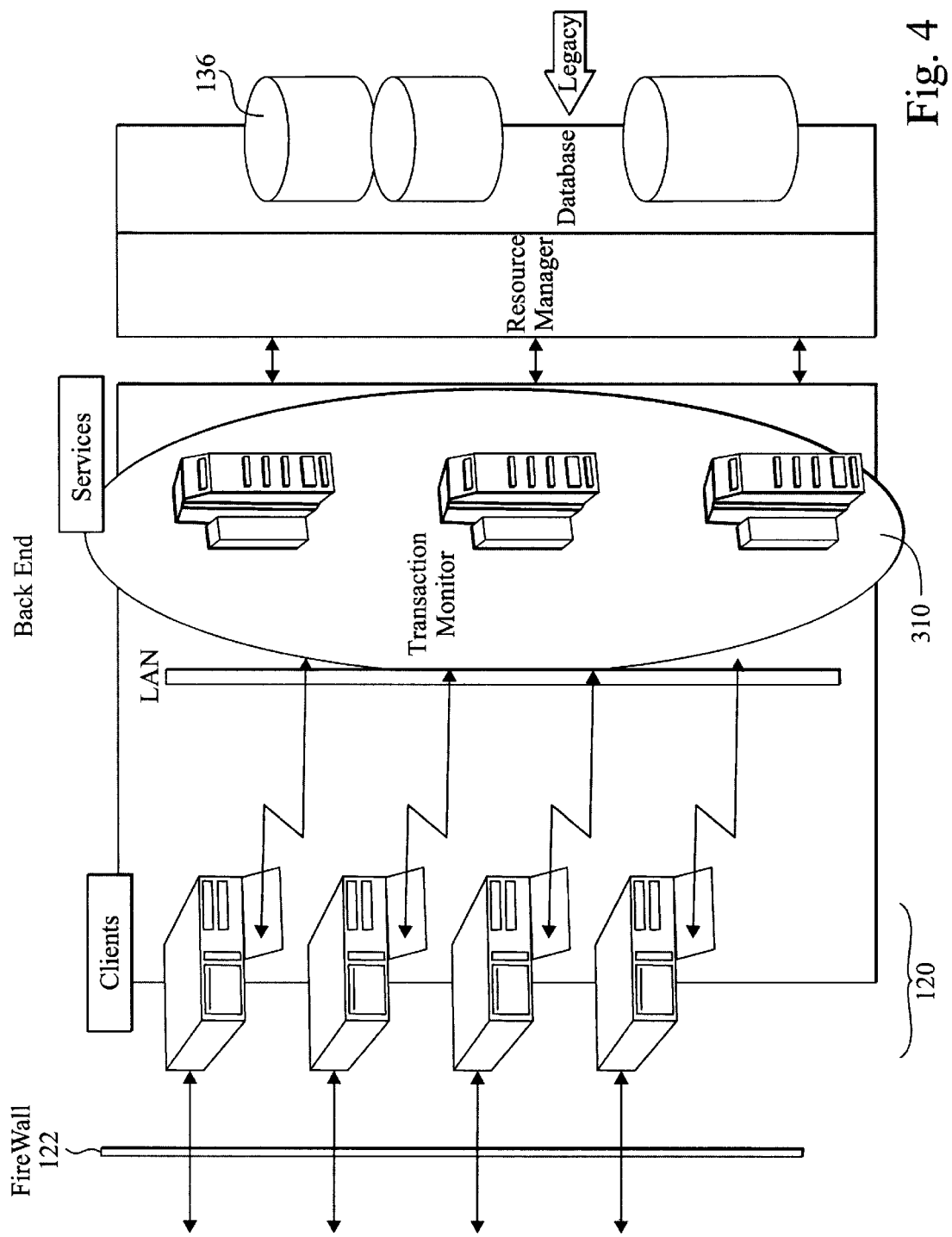
FIG. 4 illustrates the back end architecture of the preferred embodiment.

Referring to FIG. 4, the processing logic of the present invention resides in a cluster of application servers 120. The application 210 includes software components that interact through a "named service" paradigm; the basic re-usable logical market components have been synthesized and distributed among the application servers 120 as services 310. These basic market components 310 will be described in more detail below. Once created, each bid, query or market event is assigned a sequence of services 310 to perform in order to fully process the bid, query, or market event. To process complex auction rules and market constraints, these services 310 share a cluster of databases 136 which maintain an updated replication of data at all times. The databases 136 that store a sequential log of the trading activity and the results data bases are accessible for inquires by the legacy system.

This logical and physical distribution of the present invention provides the necessary scalability, high-availability, reliability, and configurability (i.e. the universal functionality) of the system as illustrated in this description of the preferred embodiment.

The application software 210 of the present invention provides all the capabilities necessary to support multiple auctions simultaneously, with the inherent flexibility to conform to the unique requirements and environment of each auction mechanism. The underlying structure of the software of the present invention makes it easy to define the rules of the auction (e.g., minimum accepted bids, bidding increments and length of rounds, etc), sequences of activity, required data elements, critical events, activity and flow requirements. This universal configurability is described in more detail below.

Figure 5:
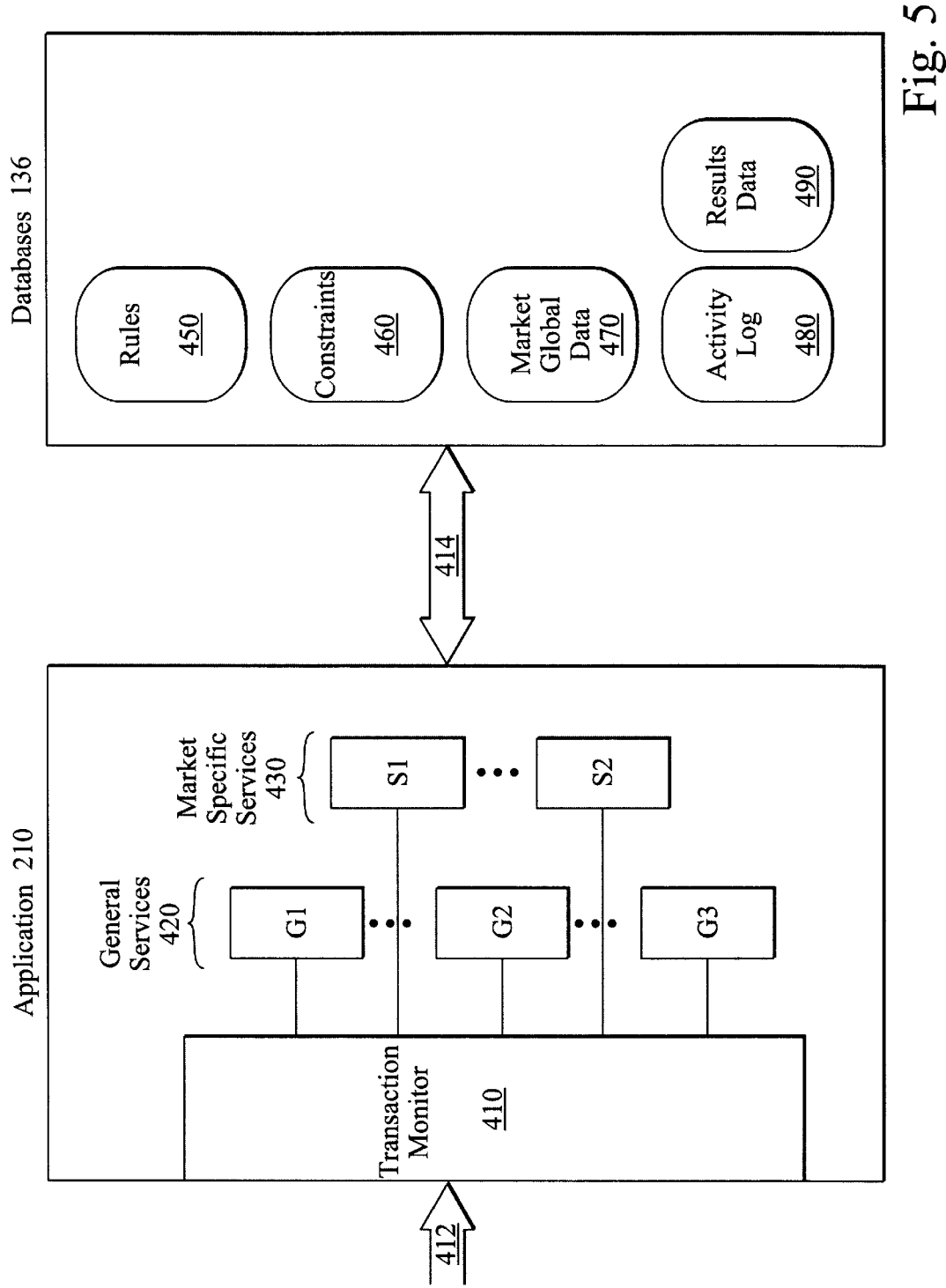
FIG. 5 illustrates a detailed block diagram of the application and databases.

Referring now to FIG. 5, a block diagram illustrates the application architecture of the present invention in more detail. The application 210 includes a transaction monitor and controller 410. The transaction monitor 410 receives requests from a client 114 and other system events via interface 412. Interface 412 may be implemented using any of a variety of conventional protocols. The requests thus received by transaction monitor 410 may represent the invocation of particular functions made available by the GUI on the client 114. In other cases, system and market events may cause a communication with transaction monitor 410. In the context of the present invention, the client requests typically correspond to a request for a specific market related action or query. For example, such requests could be the submittal or confirmation of a bid, a request for information related to traders or goods, or a request for market or trader specific constraints. Note that in prior art systems, these market specific requests are typically handled by custom logic hard-coded into the client or server software. In contrast, the present invention employs a more flexible architecture. In the preferred embodiment, the transaction monitor 410 is insulated from the details of the specific market for which it has been installed. The transaction monitor 410 receives the client requests/system events and activates a corresponding service or set of services configured to handle the request/event. These services are illustrated in FIG. 5 as general services 420 and market specific services 430.

General services 420 represent the services common to all supported market types. These services may include, for example, bid time-stamping or bid logging. The market specific services 430 represent services specific to a particular type of market or a specific individual market. For example, a service supporting a request to submit a bid for multiple goods in a single round would not be appropriate in an English auction. By partitioning the services into a general or market specific type, the present invention allows a new market type to be supported by substituting the market specific services 430 of the new market type for the market specific services of the old market type. The transaction monitor 410 and the general services 420 can remain intact. In this manner, new markets may be quickly and inexpensively created or modified.

The market specific services 430 may be implemented as Java applets or dynamic link library (DLL) modules. The services 430 may thereby be easily installed and uninstalled depending upon the market type implementation. Once installed, the service 430 registers itself with the transaction monitor 410 and identifies the client requests/system events the installed service can process. When the identified request/event is received by transaction monitor 410 through interface 412, the appropriate installed market specific service 430 is activated to process the request/event.

It will be understood by those of ordinary skill in the art that this architecture permits a first service to activate a second or other subsequent services to handle a particular request/event. As long as a service is a general service 420 (always installed) or an installed market specific service 430, the service may be used by other services without an explicit request from the client 114. In this manner, a single client request/system event my cause a cascade of services 420 and 430 to be activated.

It is also the case that particular market or system conditions may cause a particular service to respond differently to a similar request/event. The particular market and system conditions are embodied in rules 450, constraints 460, market global data 470, activity log 480, and results data 490 retained in databases 136. Rules 450 represent the particular manner in which a specific market of a particular type is to be administered. Rules 450 include, for example, the specification of minimum accepted bids, bidding increments and length of rounds. Constraints 460 represent boundary conditions that limit certain actions to a defined domain. For example, constraints 460 may include price restrictions, quantity restrictions, and/or trader limits. The rules 450 and constraints 460 are used by the services 430 to determine the manner in which a particular request/event is to be handled for a specific market. By maintaining the rules 450 and constraints 460 in a database, the specific details of a particular market may be easily changed or augmented. This database design along with the partitioning of services into general and market specific services allows greater flexibility in creating a new market and in modifying an existing market.

Market global data 470 is used to retain global market state data for access or modification by any of the services 420 and 430. The specification of the market type is initially retained in the global data 470. Activity log 480 is a sequential repository for storage of market and system parameters, timing information, and transaction information with which the detailed operation and status of the market may be monitored or re-created. Results data 490 is used to retain the final results and parameters for a specific market.

Figure 6:
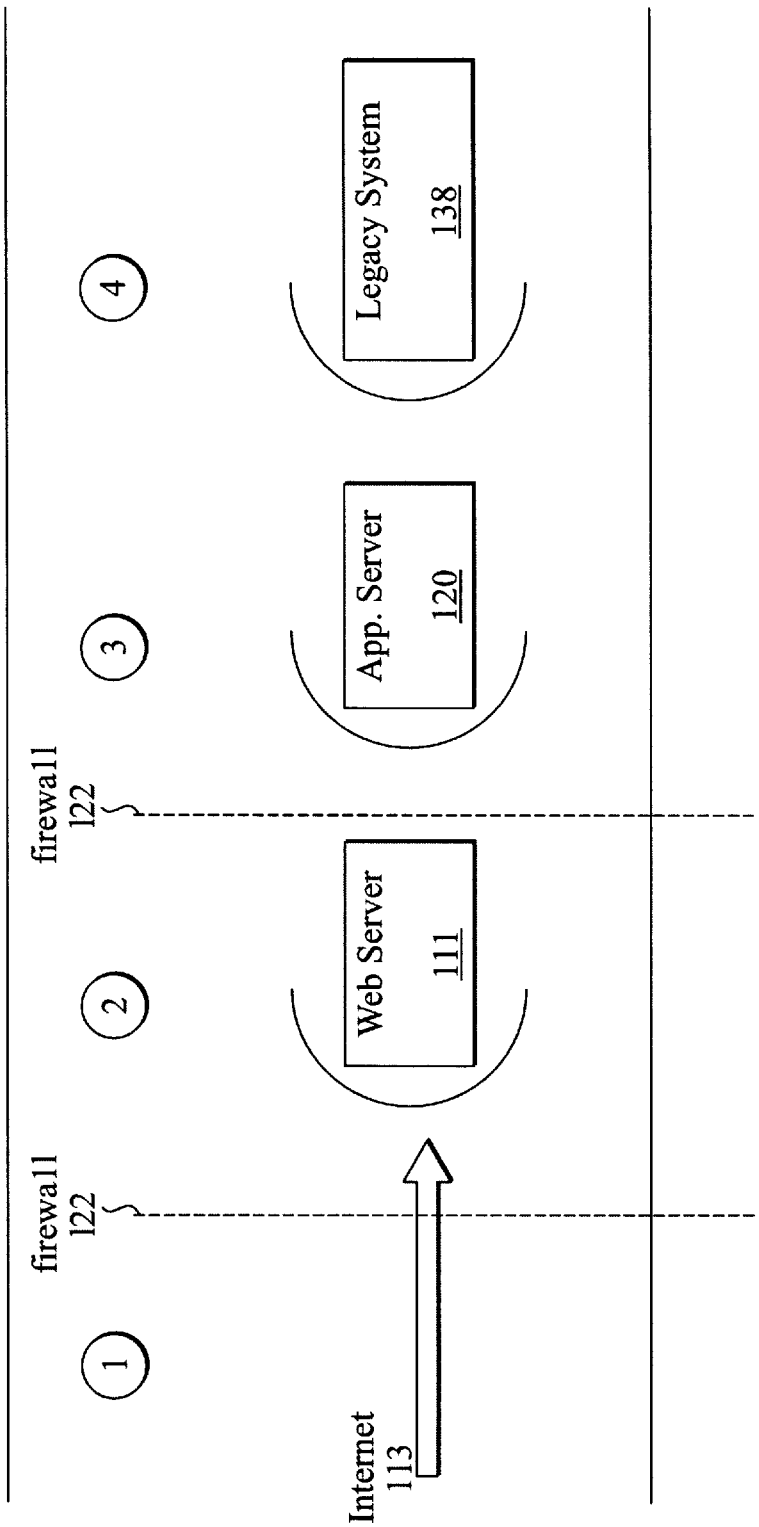
FIG. 6 illustrates the relationship of the various tiers of the system to each other and in relation to a legacy system.

FIG. 6 illustrates the relationship of the various tiers of the system to each other and in relation to a legacy system 138.

Figure 7:
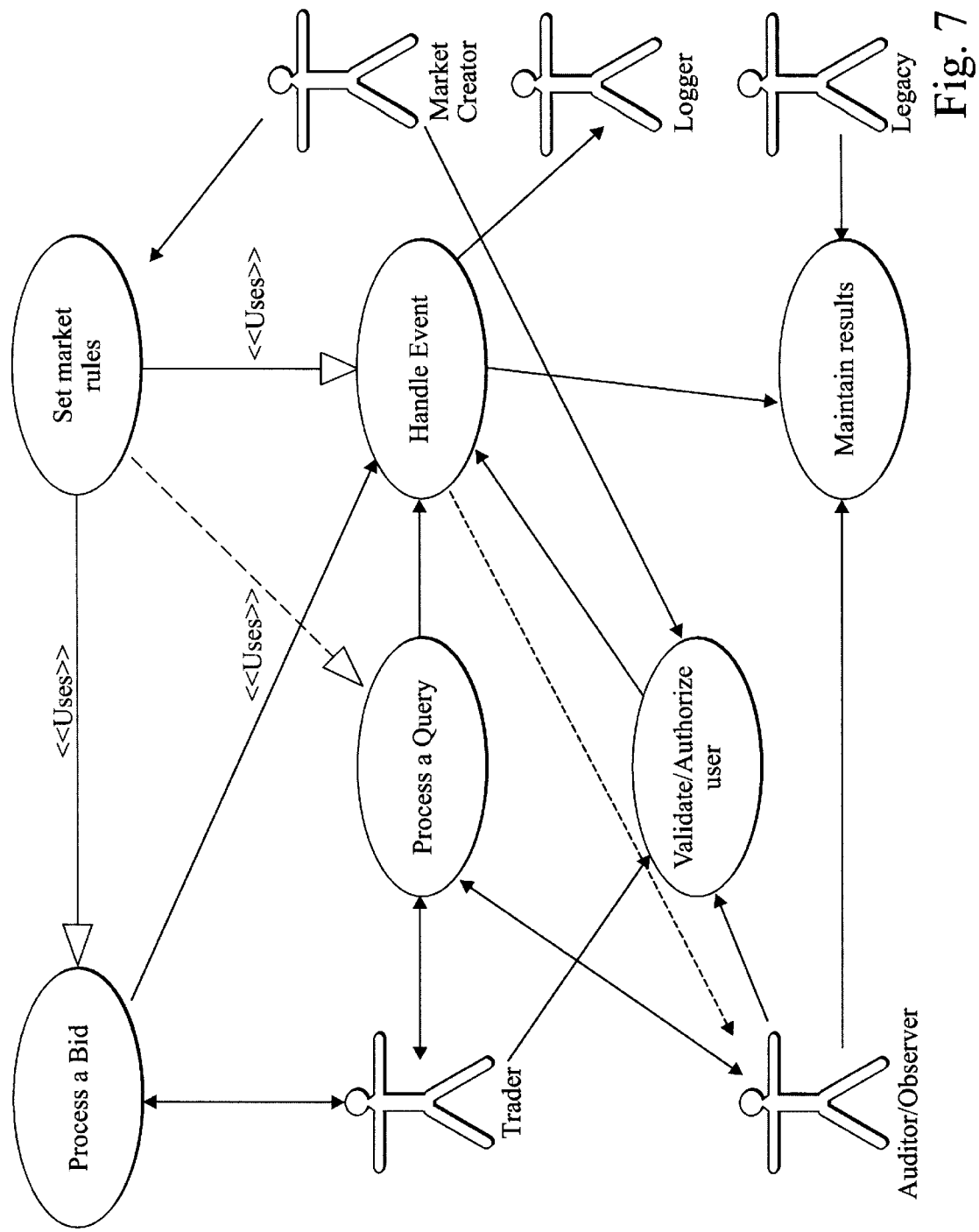
FIG. 7 outlines the use case view of the system.

FIG. 7 outlines the use case view of the system, as generated by a conventional modeling tool. The present invention is used by a variety of different types of actors. These types of actors are described as follows:

Actors:

Trader—The system of the present invention was built to serve traders (sellers and bidders). A trader interacts with the system through the submission of a trade (either a Bid or a Query). The system is trade-centric; each submitted trade is assigned a processing flow that consists of a partially ordered sequence of services 310 that the trade must go through, and the dynamic constraints with which the trade must comply. At each processing step, the trader is notified of the progress of the bid. This notification is described in more detail below in connection with the description of the graphical user interface. In addition, the trader is notified of general market events.

Market Creator—The present invention allows a market creator to define all the administrative data, activity parameters, processing constraints, and general rules that make the market (e.g. number and names of auctions, clearing-price rules, names and access authorizations of traders, inter-processing dependencies, bid flow constraints, etc.). These settings are provided to the system through the Graphical User Interface.

Legacy—The legacy system is a conventional system and typically an auction-specific system that retrieves statistics and results of auctions from the present invention.

Logger—The logger logs (with time stamps) and maintains and all trading events and market statistics for later analysis, auditing, and publication.

Auditor/Observer—The auditor submits global queries, monitors the market, and receives online and offline global information Given these actors as described above, the present invention is used to perform various basic functions for setting up and operating a market. The following section, along with the diagram illustrated in FIG. 7, describes some of these basic use functions and relationships.

Use Cases:

Set market rules—Initiated by a market creator to set the rules of the market.

Process a Bid/Process a Query—Initiated by a trader—allows a trader to submit a bid/query and accept a confirmation. Bid/query is assigned with a service flow that determines its processing cycle. Bids may be rejected, change the Market State, or have no influence on the market.

Handle Event—Initiated by the system. The market creator determines which events are the significant events (e.g., sudden shift of eligibility from one action within a group to another, a close of an auction, sudden global price drop in the market, significant change in trading volume, etc.). The logger logs all events.

Validate/Authorize user—Initiated by a trader/auditor/creator to get permission to interact with the system. Subject to changes by the market creator.

Maintain results—Initiated by the legacy system to get auction results.

The graphical user interface (GUI) of the present invention allows users, either auction administration staff or bidders, to view the results for a desired auction round and to create custom file formats of the results for downloading. The GUI runs on the client computer system 114. The GUI provides screens that display the results of each round as well as auction administration screens that display real-time bidding activity. The GUI software allows the auctioneer's administration staff to post general announcements concerning the auction in real-time (e.g., the auction schedule) and to post urgent messages to all bidders (e.g., a round has been extended). In addition, the GUI software allows users to submit a report of all suggestions for the auction administration staff to review.

Any trading step that occurs in the system (e.g., login of the trader, approval of a query, change of clearing price, reduced eligibility, etc.) is time-stamped and logged in activity log 480. In addition, the system maintains a special database 490 for storing the final results and parameters for each auction. The system supports an on-line display of global cross auction activities and statistics. This functionality provides a wide variety of reports for the various phases of the trading process. Auction reports include all bids in the round, the high bids at the end of the round, the withdrawn bids, the maximum eligibility amounts for each bidder, and the minimum accepted bid amounts for the next round.

Thus, a method and apparatus for designing and deploying a universal, interactive, real-time, on-line trading market system serving traders communicating via the Internet is disclosed. Although the present invention has been described with reference to specific exemplary embodiments, it will be apparent to those of ordinary skill in the art that various modifications and augmentations may be made to these embodiments without departing from the broader spirit and scope of the present invention as set forth in the following claims.

What is claimed is:

1. A universal auction specification system comprising:
   a market-specification console configured to receive at least one market protocol, the market-specification console submits a market defined by the at least one market protocol to a programmable auction server;
   the programmable auction server executes at least one built-in trading primitive and at least one network augmented nonstandard trading primitive; and
   a script generator for combining the set of trading primitives into a temporal protocol script representing a particular auction specification.

2. The universal auction specification system as claimed in claim 1, wherein the scripting generator is a graphical user interface based tool.

3. A programmable auction server comprising:
   a network accessible set of built-in trading primitives and network augmented nonstandard trading primitives; and
   a script interpreter for interpreting a temporal protocol script representing a particular auction specification, the script including references to at least a portion of the set of trading primitives.

4. The programmable auction server as claimed in claim 3 further including:
   means for receiving a client market request via a network;
   means for associating the client request with at least one market specific service, said service being independently installable;
   means for accessing market specific information, said market specific information being independently stored; and
   means for processing the client market request to produce a result.

5. The programmable auction server as claimed in claim 4 wherein said market specific information further includes rules and constraints.

6. The programmable auction server as claimed in claim 3 further including:
   a dual firewall front end.

7. The programmable auction server as claimed in claim 3 further including a registration component which registers all trades in specified markets, whether consummated on a local server or other servers.

8. The programmable auction server as claimed in claim 3 further including a set of application program interfaces for program trading over the network.

9. The programmable auction server as claimed in claim 3 further including a market administration console.

10. A universal trading console comprising:
    means for determining a market type;
    means for transmitting a client market request via a network wherein the market type uses a network accessible set of built-in trading primitives and network augmented nonstandard trading primitives, said client market request being consistent with said market type;
    means for receiving a response to said client market request and means for displaying information related the response; and
    means for displaying collateral information related to the response.

11. The universal trading console as claimed in claim 10 further including: means for submitting a bid.

12. The universal trading console as claimed in claim 10 further including: means for programming automated bidding agents.

13. A universal surveillance console comprising:
    means for determining a market type wherein the market type uses a network accessible set of built-in trading primitives and network augmented nonstandard trading primitives;
    means for transmitting a client market request via a network, said client market request being consistent with said market type;
    means for receiving a response to said client market request and means for displaying information related to the response;
    means for displaying collateral information related to the response; and
    means interrupting normal operation of a market.

* * * * *